United States Patent
Yao

(10) Patent No.: US 11,704,896 B2
(45) Date of Patent: Jul. 18, 2023

(54) METHOD, APPARATUS, DEVICE AND STORAGE MEDIUM FOR IMAGE PROCESSING

(71) Applicant: Beijing Baidu Netcom Science and Technology Co., Ltd., Beijing (CN)

(72) Inventor: Meng Yao, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 103 days.

(21) Appl. No.: 17/213,764

(22) Filed: Mar. 26, 2021

(65) Prior Publication Data

US 2021/0216811 A1   Jul. 15, 2021

(30) Foreign Application Priority Data

Jun. 30, 2020 (CN) .......................... 202010623701.6

(51) Int. Cl.
*G06V 10/74* (2022.01)
*G06V 20/40* (2022.01)
(Continued)

(52) U.S. Cl.
CPC ............ *G06V 10/761* (2022.01); *G06F 18/22* (2023.01); *G06V 10/762* (2022.01); *G06V 20/48* (2022.01); *G06V 20/49* (2022.01)

(58) Field of Classification Search
CPC .... G06V 10/762; G06V 10/761; G06V 20/49; G06V 20/48; G06K 9/6267;
(Continued)

(56) References Cited

U.S. PATENT DOCUMENTS

| 2017/0078646 | A1 | 3/2017 | Matsunobu et al. |
| 2019/0051036 | A1 | 2/2019 | Matsunobu et al. |
| 2020/0202563 | A1 | 6/2020 | Mogami |

FOREIGN PATENT DOCUMENTS

| JP | 2002-133420 A | 5/2002 |
| JP | 2016-010144 A | 1/2016 |

(Continued)

OTHER PUBLICATIONS

Farenzena, Michela, Andrea Fusiello, and Riccardo Gherardi. "Structure-and-motion pipeline on a hierarchical cluster tree." 2009 IEEE 12th international conference on computer vision workshops, ICCV workshops. IEEE, 2009. (Year: 2009).*

(Continued)

*Primary Examiner* — Vu Le
*Assistant Examiner* — Tracy Mangialaschi
(74) *Attorney, Agent, or Firm* — Nixon Peabody LLP

(57) ABSTRACT

A Method, apparatus, device, and storage media for image processing are provided. The method include: acquiring a set of image sequences, the set of image sequences including a plurality of image sequences; determining a first similarity measurement between image sequences in the set of image sequences; dividing the set of image sequences into one or more subset of image sequences based on a first similarity measurement; and determining, in each subset of image sequences, degrees of correlation between images in one image sequence of the subset of image sequences and images in other image sequences of the subset of image sequences.

13 Claims, 8 Drawing Sheets

(51) Int. Cl.
*G06V 10/762* (2022.01)
*G06F 18/22* (2023.01)

(58) Field of Classification Search
CPC .... G06K 9/6215; G06K 9/6218; G06F 18/22; G06F 18/23; G06F 18/24
See application file for complete search history.

(56) References Cited

FOREIGN PATENT DOCUMENTS

| | | | |
|---|---|---|---|
| JP | 2017-194935 | A | 10/2017 |
| KR | 101910609 | B1 | 10/2018 |
| WO | 2019058487 | A1 | 3/2019 |

OTHER PUBLICATIONS

Xie, Xiuchuan, et al. "Hierarchical clustering-aligning framework based fast large-scale 3D reconstruction using aerial imagery." Remote Sensing 11.3 (2019): 315. (Year: 2019).*

European Patent Office, Extended European Search Report for Application No. 21165537.8, dated Sep. 3, 2021 (6 pages).

Farenzenam, M. et al.; "Structure-and-motion pipeline on a hierarchial cluster tree"; 2009 IEEE 12$^{th}$ International Conference on Computer Vision Workshops, ICCV Workshops, pp. 1489-1496; Kyoto, Japan; Sep. 27-Oct. 4, 2009; Institute of Electrical and Electronics Engineers; Piscataway, New Jersey, Sep. 27, 2009; XP031664465, ISBN: 978-1-4244-4442-7 (8 pages).

Stathopoulou, E.-K. et al.; "Open-Source Image-Based 3D Reconstruction Pipelines: Review, Comparison and Evaluation"; ISPRS—International Archives of the Photogrammetry, Remote Sensing and Spatial Information Sciences, vol. XLII-2/W17, pp. 331-338, Nov. 29, 2019; XP055835368; ISSN: 2194-9034 (8 pages).

Sturgess, P. et al.; "Combining Appearance and Structure from Motion Features for Road Scene Understanding"; Proceedings of the British Machine Vision Conference 2009, Sep. 7, 2009, pp. 62.1-62.11; XP055835362, DOI: 10.5244/C.23.62; ISBN: 978-1-901725-39-1 (11 pages).

* cited by examiner

METHOD, APPARATUS, DEVICE AND STORAGE MEDIUM FOR IMAGE PROCESSING

CROSS-REFERENCE TO RELATED APPLICATIONS

This application claims the priority of Chinese Patent Application No. 202010623701.6, titled "METHOD, APPARATUS, DEVICE AND STORAGE MEDIUM FOR IMAGE PROCESSING", filed on Jun. 30, 2020, the content of which is incorporated herein by reference in its entirety.

TECHNICAL FIELD

The present disclosure relates generally to computer vision techniques, and more particularly to image processing techniques in three-dimensional image reconstruction.

BACKGROUND

It is important to accurately reconstruct three-dimensional images in many fields. In order to accurately reconstruct a three-dimensional image from a large number of two-dimensional images, it is necessary to perform feature matching calculation on a large number of two-dimensional images. The feature matching calculation requires matching of pixels between different images and is therefore very computationally expensive, time-consuming and resource-consuming.

SUMMARY

The present disclosure provides a method, apparatus, device, and storage medium for image processing.

According to first aspect of the present disclosure, there is provided a method of image processing, including: obtaining a set of image sequences, the set of image sequences including a plurality of image sequences; determining a first similarity measurement between image sequences of the set of image sequences; dividing the set of image sequences into one or more subsets of image sequences based on the first similarity measurement; and determining, in each subset of image sequences, degrees of correlation between images in one image sequence of the subset of image sequences and images in other image sequence of the subset of image sequences.

According to second aspect of the present disclosure, there is provided an apparatus for image processing, including: an image sequence set acquisition module configured to acquire a set of image sequences, the set of image sequences includes a plurality of image sequences; a similarity measurement determining module configured to determine a first similarity measurement between image sequences of the set of image sequences; an image sequence set dividing module configured to divide the set of image sequences into one or more subset of image sequences based on the first similarity measurement; and an image correlation degree determining module configured to determine, in each subset of image sequences, degrees of correlation between images in one image sequence of the subset of image sequences and images in other image sequence of the subset of image sequences.

According to third aspect of the present disclosure, there is provided an electronic device characterized in that including at least one processor; and a memory in communication connection with the at least one processor; where the memory stores instructions executable by the at least one processor, to enable the at least one processor to perform the method according to the first aspect of the present disclosure when executed by the at least one processor.

According to yet another aspect of the present disclosure, there is provided a non-transitory computer readable storage medium having stored thereon computer instructions, characterized in that the computer instructions causing a computer to perform a method according to a the first aspect of the present disclosure.

It is to be understood that the description in this section does not intend to identify key or critical features of the embodiments of the disclosure, nor does it intend to limit the scope of the disclosure. Other features of the present disclosure will become readily apparent from the following description.

BRIEF DESCRIPTION OF THE DRAWINGS

The drawings are intended to provide a better understanding of the present disclosure and are not to be construed as limiting the application. Where.

DETAILED DESCRIPTION OF EMBODIMENTS

Description of exemplary embodiments of the present disclosure are described below in connection with the accompanying drawings, in which various details of the embodiments of the present disclosure are included to facilitate understanding, and are to be considered as exemplary only. Accordingly, one of ordinary skill in the art will recognize that various changes and modifications may be made to the embodiments described herein without departing from the scope and spirit of the present disclosure. Also, for clarity and conciseness, descriptions of well-known functions and structures are omitted from the following description.

Accurate reconstruction of three-dimensional images plays an important role in many fields. For example, in the field of automatic-driving, the reconstructed high-precision three-dimensional map may help the computing platform of the automatic-driving vehicle to make correct driving decisions, route planning, and the like. However, in order to accurately reconstruct a high-precision three-dimensional map from a large number of images, it is necessary to perform feature matching calculation on a large number of images. The feature matching calculation requires matching of pixels between different images and is therefore very computationally expensive, time-consuming and resource-consuming.

Prior to performing the feature matching calculations, determining the degrees of correlation between the images may help to reduce the amount of computation of the feature matching and improve computational efficiency, because the feature matching may be performed only for correlated images.

Currently, before feature matching in three-dimensional image reconstruction is performed, a set of image sequences is clustered only according to position information and acquisition time of an acquired image sequence or video, and then a feature matching calculation is performed on the video image within the cluster. In this way, however, the computation of the required feature matching is still large.

According to embodiments of the present disclosure, an image processing scheme is proposed. In this scheme, an image sequence set including a set of image sequences is divided into one or more sub-sets of image sequences according to the similarity between the image sequences, and then degrees of correlation between the images in one image sequence and the images in other image sequence in the sub-set of image sequences is determined in each sub-set of image sequences. In this manner, it is possible to effectively determine the image having a high degree of correlation, so that subsequent feature matching calculation, which is time-consuming and resources-consuming, may be performed only for the determined image having the high degree of correlation, thereby reducing the calculation amount and improving the calculation efficiency.

Figure 1:
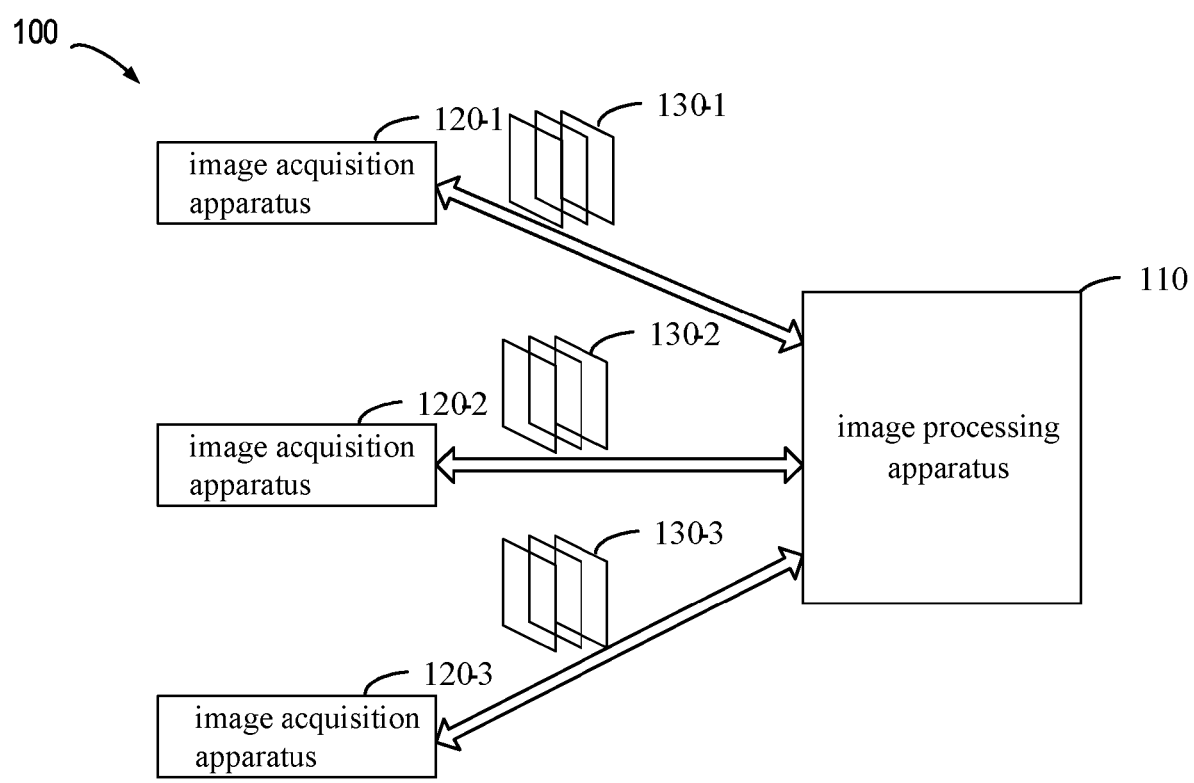
FIG. 1 is a schematic diagram of an example environment in which embodiments of the present disclosure may be implemented.

FIG. 1 is a schematic diagram of an example environment 100 in which embodiments of the present disclosure may be implemented. As shown in FIG. 1, the example environment 100 includes an image processing apparatus 110 and image acquisition apparatus 120-1 to 120-3 (collectively named as image acquisition apparatuses 120). The image acquisition device 120 may acquire the image sequences 130-1 to 130-3 (collectively named as image sequences 130) and transmit the image sequences 130 to the image processing apparatus 110. The image processing device 110 may determine the degrees of correlation between images of the image sequence 130. In some embodiments, the image processing device 110 may be a computer, a virtual machine, a server, or the like. The image acquisition apparatus 120 may be a camera, a video camera, or the like. The image processing apparatus 110 and the image acquisition apparatus 120 may communicate with each other through a network. The network may be the Internet, an intranet, or the like.

It is to be understood that the example environment 100 is described for illustrative purposes only and does not imply any limitation on the scope of the present disclosure. For example, embodiments of the present disclosure may also be applied to environments other than the example environment 100. It is to be understood that the specific number of apparatuses described above is given for illustrative purposes only and does not imply any limitation on the scope of the disclosure. For example, embodiments of the present disclosure may also be applied to more image processing apparatus 110, more or fewer image acquisition apparatus 120. Alternatively, embodiments of the present disclosure may also integrate the image processing apparatus 110 and the image acquisition apparatus 120 into the same apparatus.

Figure 2:
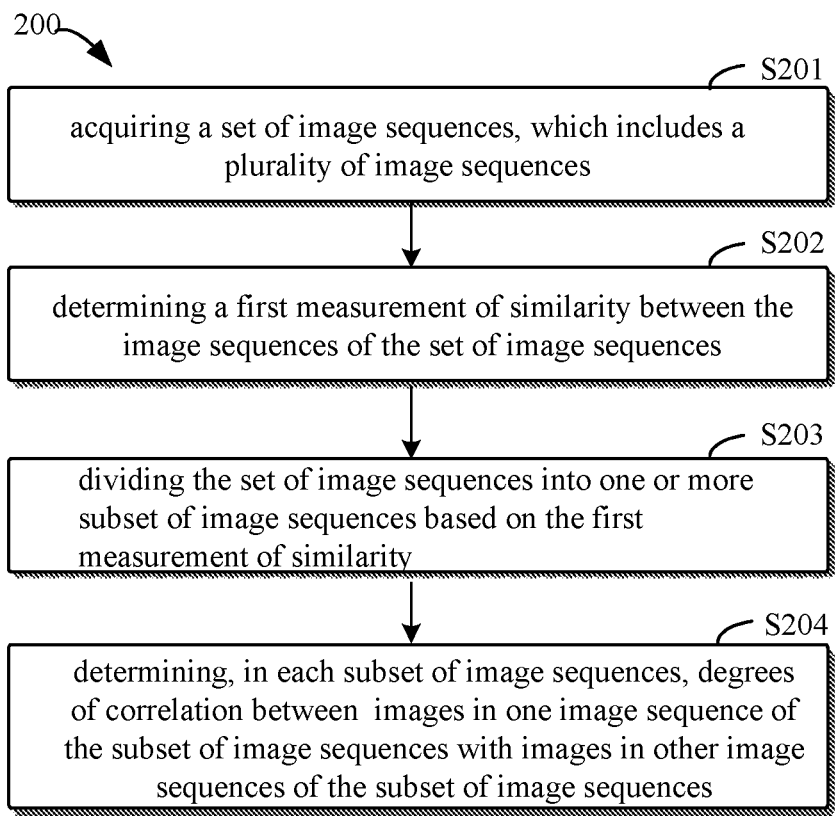
FIG. 2 is a schematic diagram of an image processing method according to embodiments of the present disclosure.

FIG. 2 is a schematic diagram of an image processing method 200 according to embodiments of the present disclosure. In some embodiments, the method 200 may be implemented in the image processing apparatus 110 shown in FIG. 1. For ease of understanding, the specific data referred to in the following description are exemplary only and does not intend to limit the scope of the present disclosure.

At S201, the image processing apparatus 110 may acquire a set of image sequences, and the set of image sequences includes a plurality of image sequences.

In some embodiments, the image processing apparatus 110 may acquire a set of image sequences from different image acquisition apparatus 120. Additionally or alternatively, in other embodiments, the image processing apparatus 110 may acquire a set of image sequences from the same image acquisition apparatus 120. Additionally, in some embodiments, the image acquisition apparatus 120 may be a visual information acquisition device in the vehicle whose computing platform may control the visual information acquisition device of the vehicle to acquire an image by acquiring information in a bus control system of the vehicle, and transmit the processed image sequence to the image processing apparatus 110. For example, the computing platform of the vehicle may control the video information acquisition device of the vehicle to acquire an image every 0.33 rotation of the wheel by acquiring the rotation speed information of the wheel, and transmit a sequence of images arranged in chronological order to the image processing apparatus 110.

In some embodiments, while the image is acquired, the image acquisition apparatus 120 may at the same time record geographic location information for the acquired image, such as GPS information, and time information for the acquired image. Thus, in some embodiments, the set of image sequences may be a set of image sequences acquired at adjacent geographic locations. For example, a set of image sequences acquired at the same road segment, adjacent road segment, etc. Additionally or alternatively, the set of image sequences may be a set of image sequences acquired within the same time period. For example, a set of image sequences acquired in the same season, in the same month, in the same week, etc.

At S202, the image processing apparatus 110 may determine a first measurement of similarity between the image sequences in the set of image sequences.

In some embodiments, the image processing apparatus 110 may first determine a feature vector corresponding to each image in the set of image sequences, and then determine a similarity between the image sequences based on the feature vectors of the images. For example, for an image sequence 1 having 1000 images, the image processing apparatus 110 may determine 1000 feature vectors respectively corresponding to the 1000 images. Similarly, for the image sequence 2 having 2000 images, the image processing apparatus 110 may determine 2000 feature vectors corresponding to the 2000 images, respectively. Then, the image processing apparatus 110 may calculate the vector distance between the 1000 feature vectors corresponding to the image sequence 1 and the 2000 feature vectors corresponding to the image sequence 2, for example, the Euclidean distance, the Manhattan distance, the Chebyshev distance, the included angle cosine distance, and the like, to represent the similarity between the image sequence 1 and the image sequence 2.

It is to be understood that the number of images in an image sequence, the vector distance characterizing similarity, and the like are shown by way of example only, without implying limitations on the present disclosure. For example, various methods may be employed to calculate feature vectors of the image; Other vector distances may also be used to characterize similarity between image sequences. The present disclosure is not limited in these respects.

At S203, the image processing apparatus 110 may divide the set of image sequences into one or more subsets of image sequences based on the first measurement of similarity.

Figure 3A:
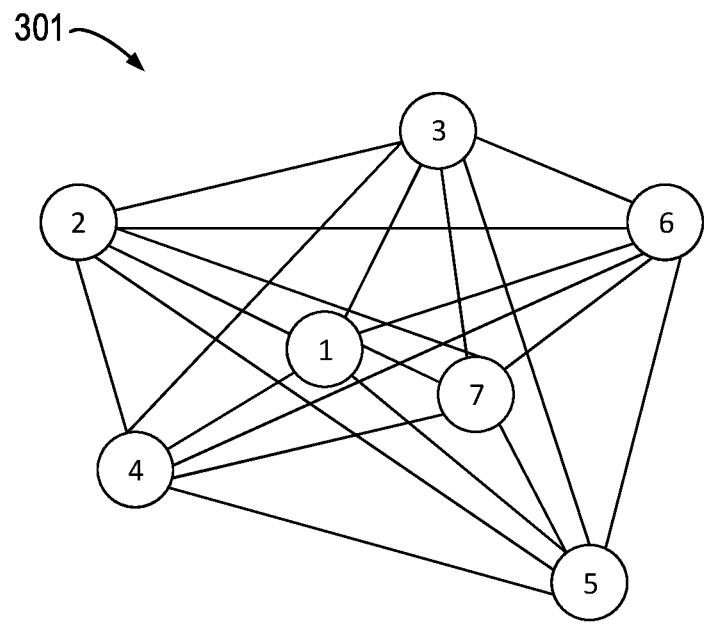
FIG. 3a is a schematic diagram of a set of image sequences according to embodiments of the present disclosure.
Figure 3B:
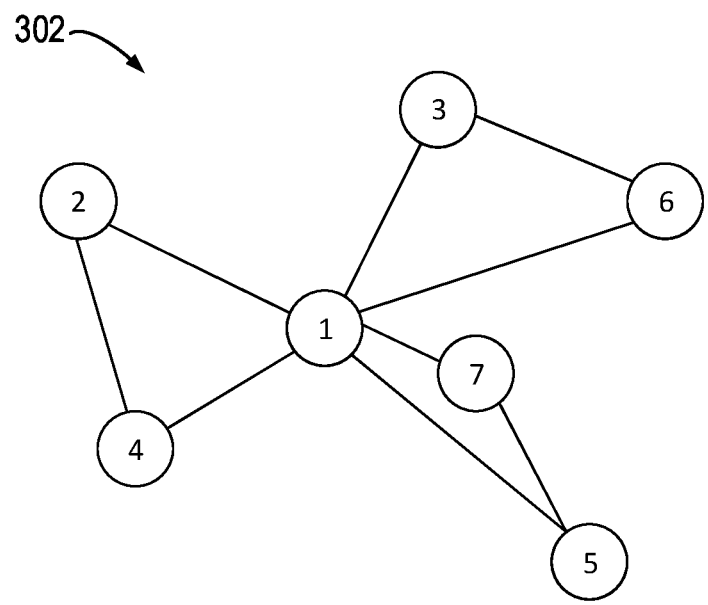
FIG. 3b is a schematic diagram of a plurality of subsets of image sequences according to embodiments of the present disclosure.

FIG. 2 is further described below with reference to FIG. 3a and FIG. 3b. FIG. 3a is a schematic diagram 301 of a set of image sequences according to embodiments of the present disclosure. FIG. 3b is a schematic diagram 302 of a plurality of image sequence subsets according to embodiments of the present disclosure. As shown in FIG. 3a, seven acquired image sequences are denoted by reference numerals 1 to 7, respectively. The number of images in each image sequence may be the same or different. In conventional three-dimensional image reconstruction schemes, feature matching calculations are performed between images in every two image sequences. As shown in FIG. 3b, the seven image sequences are divided into three image sequence subsets, where the image sequences 1, 2 and 4 form one image sequence subset, the image sequences 1, 3 and 6 form one image sequence subset, and the image sequences 1, 5 and 7 form one image sequence subset. Details on how to divide the set of image sequences into one or more subsets of image sequences will be described in detail below with reference to FIG. 5.

Returning now to FIG. 2. At S204, the image processing apparatus 110 may determine, in each subset of image sequences, the degrees of correlation of the images in one image sequence of the subset of image sequences with the images in other image sequences of the subset of image sequences.

For example, in some embodiments, the image processing apparatus 110 may determine the degrees of correlation of the images in one image sequence of the subset of image sequences with the images in other image sequences of a subset of image sequences, by determining a feature vector for each image and then calculating a vector distance between the feature vectors. For example, still referring to FIG. 3b, for the subset of image sequences consisting of image sequences 1, 2, and 4, the image processing apparatus 110 may determine the degrees of correlation of the images in image sequence 1 with the images in image sequence 2 or image sequence 4.

Figure 4:
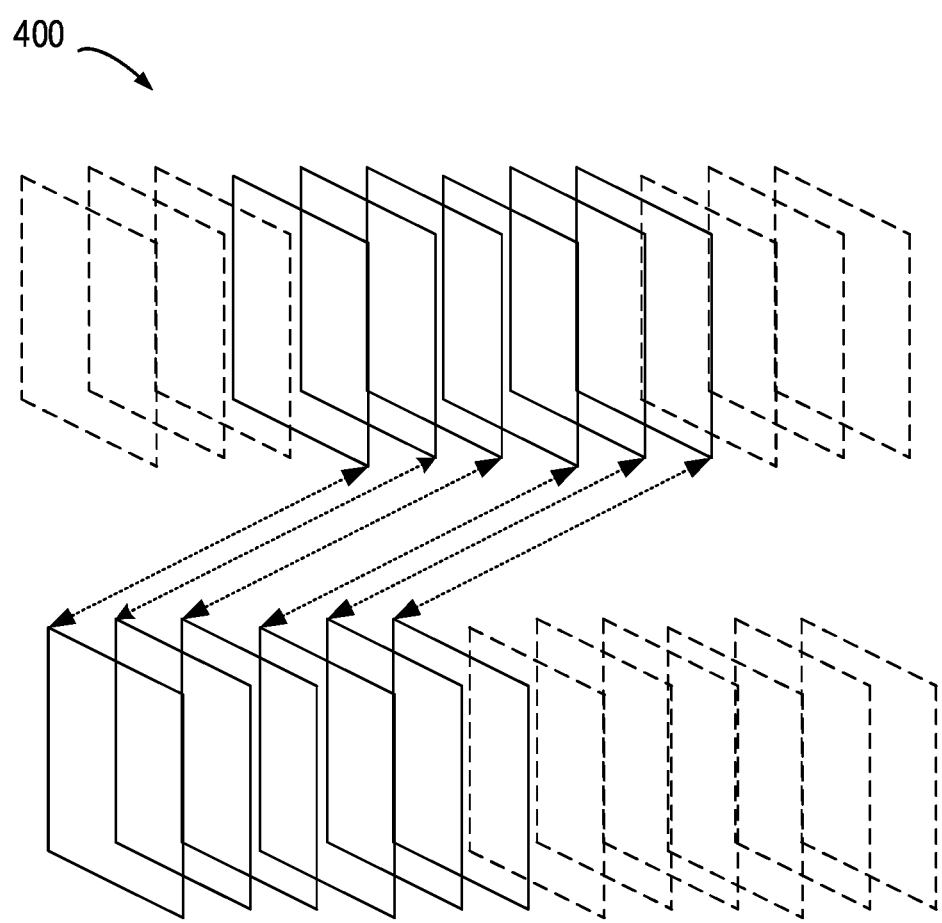
FIG. 4 is a schematic diagram of two image sequences in a subset of image sequences according to embodiments of the present disclosure.

Additionally, in some embodiments, the image processing apparatus 110 may determine the correlated images in each subset of image sequences based on the degrees of correlation of the images, and calculate a feature match of the correlated images for three-dimensional image reconstruction. Additionally, in some embodiments, the image processing apparatus 110 may construct a correlation profile of images based on the determined correlated images, to indicate which images from different image sequences have a higher degree of correlation between them. FIG. 4 is a schematic diagram 400 of two image sequences in a subset of image sequences according to embodiments of the present disclosure. As shown in FIG. 4, the image processing apparatus 110 may determine that the correlation degree of the fourth image in the upper image sequence with the first image in the lower image sequence is high, the correlation degree of the fifth image in the upper image sequence with the second image in the lower image sequence is high, and so on. Thus, in the solution of the present disclosure, feature matching calculations need to be performed only between the correlated images in each subset of image sequences.

In the above-described exemplary embodiment, by dividing the image sequence set including the set of image sequences into one or more image sequence subsets according to the similarity between the image sequences, and then determining, in each image sequence subset, the degrees of correlation of the images in one image sequence of the subset of image sequences with the images in other image sequences of the image sequence subsets, the images having a high degree of correlation may be effectively determined, so that subsequent feature matching calculation, which is time-consuming and resource-consuming, may be performed only for the determined images having the high degree of correlation, thereby reducing the calculation amount and improving the calculation efficiency.

Further, in the above-described exemplary embodiment, since the image sequence set is divided into one or more image sequence subsets, different image sequence subsets may be assigned to different computing devices to perform parallel feature matching calculations. In this way, it is possible to make full use of the calculation resources, further reduce the calculation time, and improve the calculation efficiency.

Figure 5:
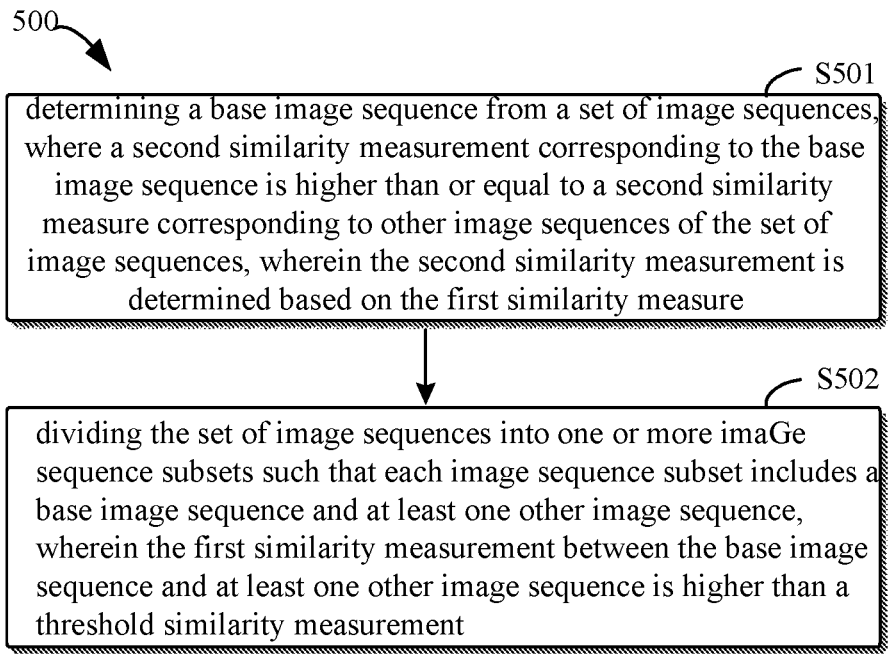
FIG. 5 is a schematic diagram of a method of dividing a set of image sequences into one or more subsets of image sequences according to embodiments of the present disclosure.

FIG. 5 is a schematic diagram of a method 500 for dividing a set of image sequences into one or more subsets of image sequences according to embodiments of the present disclosure. In some embodiments, the method 500 may be implemented in the image processing apparatus 110 shown in FIG. 1. For ease of understanding, the specific data referred to in the following description are exemplary and does not intend to limit the scope of the present disclosure.

At S501, the image processing apparatus 110 may determine a base image sequence from a set of image sequences, where a second similarity measurement corresponding to the base image sequence is higher than or equal to a second similarity measurement corresponding to other image sequences of the set of image sequences, where the second similarity measurement is determined based on the first similarity measurement.

For example, in some embodiments, the image processing apparatus 110 may first calculate the sum of the first similarity measure as a second similarity metric, based on the respective first similarity measure between each image sequence and other image sequences. The image processing apparatus 110 may then determine the image sequence having the highest second similarity measure as the base image sequence. Alternatively, in other embodiments, if more than one image sequence has the highest second similarity measurement, then this image sequence is selected from the more than one image sequences as the base image sequence. It should be understood that a method of determining the second similarity measurement from the first similarity measurement is shown for exemplary purposes only. Other ways of determining the second similarity measurement may also be used, and the present disclosure is not limited in this respect.

At S502, the image processing apparatus 110 may divide the set of image sequences into one or more image sequence subsets such that each image sequence subset includes the base image sequence and at least one other image sequence. As an option, the first similarity measurement between the base image sequence and at least one other image sequence is higher than a threshold similarity measurement.

In some embodiments, the image processing apparatus 110 may first determine, based on a threshold similarity measurement, an image sequence having a higher similarity with the base image sequence than the threshold similarity measurement. Additionally, the image processing apparatus 110 may determine a sequence of images whose similarity between each other is higher than a threshold similarity measurement. In some embodiments, the threshold similarity measurement may be predetermined. Alternatively, in other embodiments, the threshold similarity measurement may be determined based on respective first similarity measurements corresponding to each image sequence. For example, the image processing apparatus 110 may rank the respective first similarity measurement corresponding to each image sequence, and then determine the similarity ranked Nth as the threshold similarity measurement.

Figure 6A:
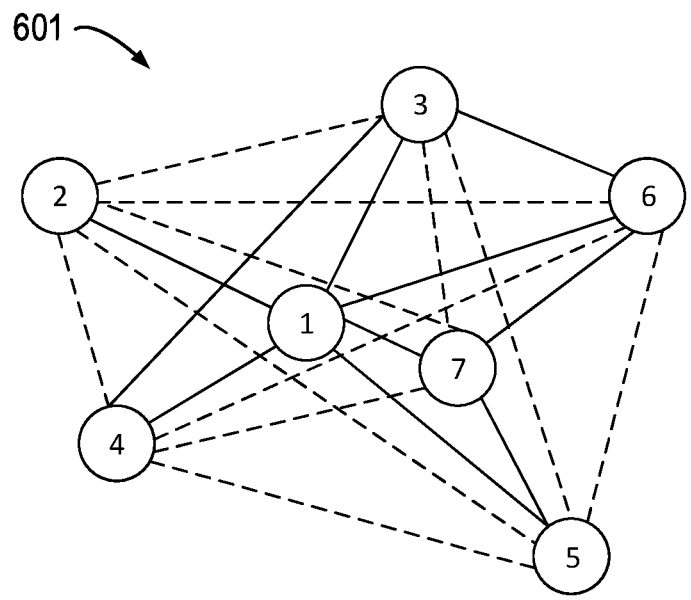
FIG. 6a is a schematic diagram of a set of image sequences according to embodiments of the present disclosure.
Figure 6B:
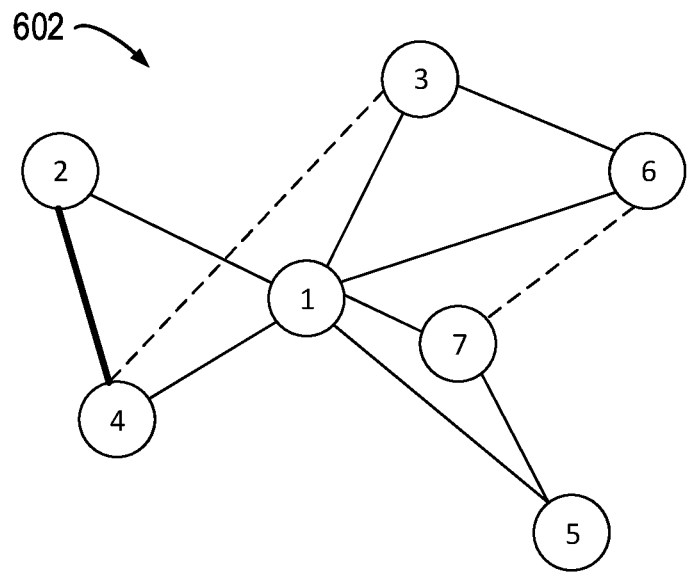
FIG. 6b is a schematic diagram of a set of image sequences according to embodiments of the present disclosure.

FIG. 5 will now be further described with reference to FIG. 6a and FIG. 6b. FIGS. 6a and 6b are schematic diagrams of sets of image sequences according to embodiments of the present disclosure. In FIG. 6a, the image sequence 1 is determined as the base image sequence. The solid line indicates that the similarity between the image sequences is higher than the threshold similarity measurement, and the dashed line indicates that the similarity between the image sequences is lower than or equal to the threshold similarity measurement. As shown in FIG. 6a, the image processing apparatus 110 may divide the image sequences connected to each other by solid lines into one image sequence subset and each image sequence subset includes the base image sequence 1. For example, the image processing apparatus 110 may divide the image sequences 1, 3, and 6 into one image sequence subset, divide the image sequences 1, 6, and 7 into one image sequence subset, divide the image sequences 1 and 2 into one image sequence subset, and so on.

Additionally, in some embodiments, the image processing apparatus 110 may adjust the divided one or more subsets of image sequences.

For example, in some embodiments, the image processing apparatus 110 may adjust one or more subsets of image sequences according to criteria that each subset of image sequences includes a predetermined number of image sequences. In some embodiments, if the number of image sequences in the image sequence subset is less than a predetermined number, one image sequence selected from other image sequences is added to the image subset. As shown in FIG. 6B, if the criterion is that each image sequence subset includes three image sequences, one image sequence subset divided by the image processing apparatus 110 includes only the image sequences 1 and 2, and the image processing apparatus 110 may add the image sequence 4 to the image sequence subset according to the first similarity measurement. In this embodiment, the degree of similarity between the image sequence 2 and the image sequence 4 is lower than the threshold measurement of similarity (denoted by dashed lines in FIG. 6a), but higher than or equal to the degree of similarity between the image sequence 2 and other image sequences except for the base image sequence 1. Therefore, under the above criteria, the image sequence 4 may be adjusted to be included in the subset of image sequences (represented by bold solid lines) composed of the image sequences 1 and 2.

Additionally or alternatively, in some embodiments, the image processing apparatus 110 may adjust one or more image sequence subsets according to criteria that each image sequence belongs to only one image sequence subset. In some embodiments, if the image sequence may be divided into a plurality of image sequence subsets, the image processing apparatus 110 may select a subset of the image sequences from the plurality of image sequence subsets to divide the image sequence. Still referring to FIG. 6B, for example, the image sequence 6 may be divided into the image sequence subset 1, 3, and 6 and the image sequence subset 1, 6, and 7 (both denoted by solid lines in FIG. 6a), then the image processing apparatus 110 may choose to divide the image sequence 6 into the image sequence subset 1, 3, and 6, and therefore, in FIG. 6B, the image sequences 6 and 7 are denoted by dashed lines instead.

In the above exemplary embodiment, by determining a base image sequence having a high degree of similarity to all other image sequences of the set of image sequences, and dividing the image sequence set into one or more image sequence subsets including the base image sequence and at least one other image sequence, the image having a high degree of correlation may be determined efficiently.

Further, in the above-described exemplary embodiment, since the respective image sequence subset may be allocated to different computing devices for feature matching calculation, the divided one or more image sequence subset may be adjusted by various criteria, and computing resources may be sufficiently and evenly utilized.

Figure 7:
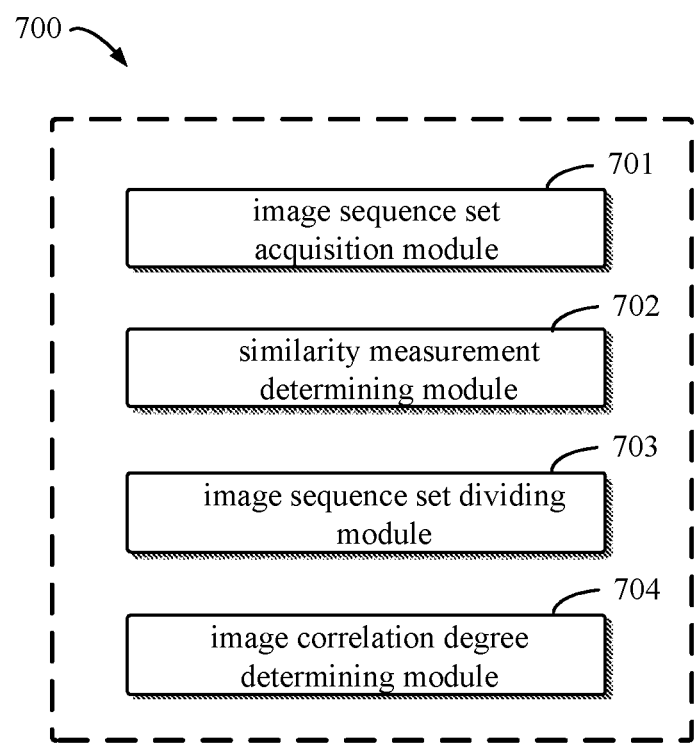
FIG. 7 is a schematic block diagram of an apparatus for image processing according to embodiments of the present disclosure.

FIG. 7 is a schematic block diagram of an image processing apparatus 700 according to embodiments of the present disclosure. As shown in FIG. 7, the apparatus 700 may include an image sequence set acquisition module 701 configured to acquire a set of image sequences, where the set of image sequences includes a plurality of image sequences; a similarity measurement determining module 702 configured to determine a first similarity measurement between image sequences of the set of image sequences; an image sequence set dividing module 703 configured to divide the set of image sequences into one or more image sequence subset based on the first similarity measurement; and an image correlation degree determining module 704 configured to determine, in each image sequence subset, correlation degrees between the images in one image sequence and the images in other image sequences of the image sequence subset.

In some embodiments, the similarity measurement determining module 702 includes a feature vector determining module (not shown) configured to determine a feature vector corresponding to each image in the set of image sequences; and a first similarity measurement determining module (not shown) configured to determine a first similarity measurement between image sequences of the set of image sequences based on the feature vector.

In some embodiments, the image sequence set dividing module 703 includes a base image sequence determining module (not shown) configured to determine a base image sequence from the set of image sequences, where a second similarity measurement corresponding to the base image sequence is higher than or equal to a second similarity measurement corresponding to other image sequences of the set of image sequences, where the second similarity measurement is determined based on the first similarity measurement; and a first image sequence set dividing module (not shown) configured to divide the set of image sequences into one or more image sequence subset such that each image sequence subset includes a base image sequence and at least one other image sequence, where the first similarity measurement between the base image sequence and the at least one other image sequence is higher than a threshold similarity measurement.

In some embodiments, a first image sequence set dividing module (not shown) includes an image sequence subset adjustment module (not shown) configured to adjust one or more image sequences, where the adjustment is based on at least one of the following criteria: each image sequence subset includes a predetermined number of image sequences; and each image sequence belongs to only one subset of image sequences.

In some embodiments, the apparatus 700 further includes a correlated image determining module (not shown) configured to determine correlated images in each subset of image sequences based on the degrees of correlation; and an image reconstruction module (not shown) configured to calculate a feature match of the correlated images for three-dimensional image reconstruction.

According to an embodiment of the present disclosure, the present disclosure also provides an electronic device and a readable storage medium.

Figure 8:
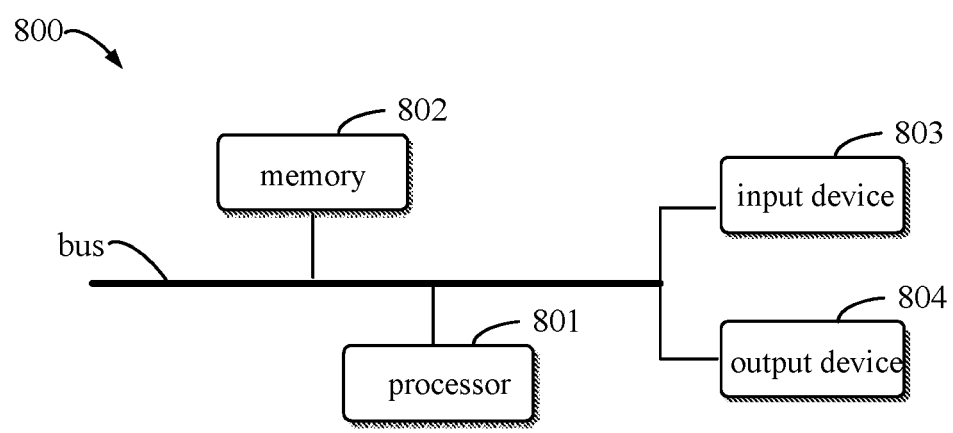
FIG. 8 is a block diagram of an electronic device for implementing a method of image processing according to embodiments of the present disclosure.

FIG. 8 is a block diagram of an electronic device of an image processing method according to an embodiment of the present disclosure. Electronic devices are intended to represent various forms of digital computers, such as laptop computers, desktop computers, worktables, personal digital assistants, servers, blade servers, mainframe computers, and other suitable computers. Electronic devices may also represent various forms of mobile devices, such as personal digital processing, cellular telephones, smart phones, wearable devices, and other similar computing devices. The components shown herein, their connections and relationships, and their functions are by way of example only and are not intended to limit the implementation of the present disclosure as described and/or claimed herein.

As shown in FIG. 8, the electronic device includes one or more processors 801, a memory 802, and an interface for connecting components, including a high speed interface and a low speed interface. The various components are interconnected by different buses and may be mounted on a common motherboard or otherwise as desired. The processor may process instructions executed within the electronic device, including instructions stored in or on a memory to display graphical information of the GUI on an external input/output device, such as a display device coupled to an interface. In other embodiments, multiple processors and/or multiple buses may be used with multiple memories, if desired. Similarly, a plurality of electronic devices may be connected, each providing a portion of the necessary operations (e.g., as a server array, a set of blade servers, or a multiprocessor system). A processor 801 is exemplified in FIG. 8.

The memory 802 is a non-transitory computer readable storage medium provided in this application. Where the memory stores instructions executable by at least one processor to cause the at least one processor to perform a method of image processing provided herein. The non-transitory computer-readable storage medium of the present disclosure stores computer instructions for causing a computer to perform a method of image processing provided herein.

The memory 802, as a non-transitory computer readable storage medium, may be used to store a non-transitory software program, a non-transitory computer executable program, and a module, such as a program instruction/module corresponding to the image processing method in the embodiment of the present disclosure (for example, the image sequence set acquisition module 701, the similarity measurement determining module 702, the image sequence set dividing module 703, and the image correlation degree determining module 704 shown in FIG. 7). The processor 801 executes various functional applications and data processing of the server by running non-transitory software programs, instructions, and modules stored in the memory 802, that is, a method of implementing image processing in the above-described method embodiment.

The memory 802 may include a storage program area and a storage data area, where the storage program area may store an operating system, an application program required by at least one function; the storage data area may store data or the like created according to use of an electronic device for image processing. In addition, memory 802 may include high speed random access memory, and may also include non-transitory memory, such as at least one magnetic disk storage device, flash memory device, or other non-transitory solid state storage device. In some embodiments, memory 802 may optionally include remotely disposed memory relative to processor 801, which may be connected to an electronic device for image processing via a network. Examples of such networks include, but are not limited to, the Internet, enterprise intranets, local area networks, mobile communication networks, and combinations thereof.

The electronic apparatus of the image processing method may further include an input device 803 and an output device 804. The processor 801, the memory 802, the input device 803, and the output device 804 may be connected via a bus or otherwise, as illustrated in FIG. 8.

The input device 803 may receive input number or character information and generate key signal input related to user settings and functional control of an electronic device for image processing, such as a touch screen, a keypad, a mouse, a track pad, a touch pad, a pointer bar, one or more mouse buttons, a trackball, a joystick, and the like as input device. The output device 804 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include being implemented in one or more computer programs that may execute and/or interpret on a programmable system including at least one programmable processor, which may be a dedicated or general purpose programmable processor capable of receiving data and instructions from a memory system, at least one input device, and at least one output device, and transmitting the data and instructions to the memory system, the at least one input device, and the at least one output device.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer-readable medium" refer to any computer program product, device, and/or means (e.g., magnetic disk, optical disk, memory, programmable logic device (PLD))

for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user; For example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other.

According to the technical solution of the embodiment of the present disclosure, by dividing a set of image sequences including the image sequence sets into one or more image sequence subset according to the similarity between the image sequences, and then determining in each image sequence subset the correlation degree between an image in one image sequence and an image in other image sequences in the image sequence subset, an image having a high correlation degree can be effectively determined, so that subsequent time-consuming and resource-consuming feature matching calculation can be performed only for the image determined having a high correlation degree, thereby reducing the calculation amount and improving the calculation efficiency. Furthermore, since the image sequence set is divided into one or more image sequence subset, different image sequence subsets may be assigned to different computing devices to perform parallel feature matching calculations. In this way, it is possible to make full use of the calculation resources, further reduce the calculation time, and improve the calculation efficiency.

It is to be understood that reordering, adding or deleting may be performed and various forms that shown above can be used. For example, the steps described in the present disclosure may be performed in parallel or sequentially or in a different order, so long as the desired results of the technical solution disclosed in the present disclosure can be realized, and no limitation is imposed herein.

The foregoing detailed description does not intend to limit the scope of the claimed solutions. It will be appreciated by those skilled in the art that various modifications, combinations, sub-combinations, and substitutions may be made depending on design requirements and other factors. Any modifications, equivalents, and modifications that fall within the spirit and principles of this application intend to be included within the scope of this application.

What is claimed is:

1. A method for image processing, comprising:
   obtaining a set of image sequences, the set of image sequences comprising a plurality of image sequences;
   determining a first similarity between each pair of image sequences in the set of image sequences;
   dividing the set of image sequences into one or more subset of image sequences based on first similarities, wherein, dividing the set of image sequences into the one or more subset of image sequences based on the first similarities comprises:
   determining a base image sequence from the set of image sequences, wherein a second similarity corresponding to the base image sequence is higher than or equal to a second similarity corresponding to each of other image sequences in the set of image sequences, wherein the second similarity corresponding to the base image sequence is determined based on first similarities between the base image sequence and each of the other image sequences, and the second similarity corresponding to each of the other image sequences is determined based on first similarities between the each image sequence and image sequences other than the each image sequence in the set of image sequences; and
   dividing the set of image sequences into a plurality of subsets of image sequence, wherein each of the subsets of the image sequences comprises the base image sequence and at least one other image sequence, wherein the first similarity between the base image sequence and the at least one other image sequence is higher than a threshold similarity; and
   determining, in each of the subset of image sequences, degrees of correlation of images in one image sequence of the subset of image sequences with images in other image sequence of the subset of image sequences.

2. The method of claim 1, wherein determining the first similarity between each pair of image sequences in the set of image sequences comprises:
   determining a feature vector corresponding to each image in the set of image sequences; and
   determining the first similarity between each pair of image sequences in the set of image sequences based on the feature vector.

3. The method of claim 1, wherein dividing the set of image sequences into the one or more subset of image sequences such that each subset of the image sequences comprises the base image sequence and at least one other image sequence comprises:
   adjusting the one or more subsets of image sequences based on at least one of the following criteria:
   each subset of image sequences comprises a predetermined number of image sequences; and
   each of the image sequences belongs to one subset of the image sequences.

4. The method of claim 1, further comprising:
   determining correlated images in each subset of image sequences based on the degrees of correlation; and calculating a feature match of each of the correlated images for three-dimensional image reconstruction.

5. The method of claim 1, wherein the second similarity corresponding to the base image sequence is a sum of the first similarities between the base image sequence and each of the other image sequences in the set of image sequences, and the second similarity corresponding to each of the other image sequences is a sum of first similarities between the each image sequence and image sequences other than the each image sequence in the set of image sequences.

6. An electronic device, comprising:
   at least one processor; and
   a memory in communication connection with the at least one processor; wherein,
   the memory stores instructions executable by the at least one processor, to cause the at least one processor to perform operations comprising:
   obtaining a set of image sequences, the set of image sequences comprising a plurality of image sequences;
   determining a first similarity between each pair of image sequences in the set of image sequences;
   dividing the set of image sequences into one or more subset of image sequences based on first similarities, wherein, dividing the set of image sequences into the one or more subset of image sequences based on the first similarities comprises:
   determining a base image sequence from the set of image sequences, wherein a second similarity corresponding to the base image sequence is higher than or equal to a second similarity corresponding to each of other image sequences in the set of image sequences, wherein the second similarity corresponding to the base image sequence is determined based on first similarities between the base image sequence and each of the other image sequences, and the second similarity corresponding to each of the other image sequences is determined based on first similarities between the each image sequence and image sequences other than the each image sequence in the set of image sequences; and
   dividing the set of image sequences into a plurality of subsets of image sequence, wherein each of the subsets of the image sequences comprises the base image sequence and at least one other image sequence, wherein the first similarity between the base image sequence and the at least one other image sequence is higher than a threshold similarity; and
   determining, in each of the subset of image sequences, degrees of correlation of images in one image sequence of the subset of image sequences with images in other image sequence of the subset of image sequences.

7. The electronic device of claim 6, wherein determining the first similarity between each pair of image sequences in the set of image sequences comprises:
   determining a feature vector corresponding to each image in the set of image sequences; and
   determining the first similarity between each pair of image sequences in the set of image sequences based on the feature vector.

8. The electronic device of claim 6, wherein dividing the set of image sequences into the one or more subset of image sequences such that each subset of the image sequences comprises the base image sequence and at least one other image sequence comprises:
   adjusting the one or more subsets of image sequences based on at least one of the following criteria:
   each subset of image sequences comprises a predetermined number of image sequences; and
   each of the image sequences belongs to one subset of the image sequences.

9. The electronic device of claim 6, wherein the operations further comprise:
   determining correlated images in each subset of image sequences based on the degrees of correlation; and
   calculating a feature match of each of the correlated images for three-dimensional image reconstruction.

10. A non-transitory computer-readable storage medium storing computer instructions, wherein the computer instructions, when executed, causes a computer to perform operations comprising:
    obtaining a set of image sequences, the set of image sequences comprising a plurality of image sequences;
    determining a first similarity between each pair of image sequences in the set of image sequences;
    dividing the set of image sequences into one or more subset of image sequences based on first similarities, wherein, dividing the set of image sequences into the one or more subset of image sequences based on the first similarities comprises:
    determining a base image sequence from the set of image sequences, wherein a second similarity corresponding to the base image sequence is higher than or equal to a second similarity corresponding to each of other image sequences in the set of image sequences, wherein the second similarity corresponding to the base image sequence is determined based on first similarities between the base image sequence and each of the other image sequences, and the second similarity corresponding to each of the other image sequences is determined based on first similarities between the each image sequence and image sequences other than the each image sequence in the set of image sequences; and
    dividing the set of image sequences into a plurality of subsets of image sequence, wherein each of the subsets of the image sequences comprises the base image sequence and at least one other image sequence, wherein the first similarity between the base image sequence and the at least one other image sequence is higher than a threshold similarity; and
    determining, in each of the subset of image sequences, degrees of correlation of images in one image sequence of the subset of image sequences with images in other image sequence of the subset of image sequences.

11. The storage medium of claim 10, wherein determining the first similarity between each pair of image sequences in the set of image sequences comprises:
    determining a feature vector corresponding to each image in the set of image sequences; and
    determining the first similarity between each pair of image sequences in the set of image sequences based on the feature vector.

12. The storage medium of claim 10, wherein dividing the set of image sequences into the one or more subset of image sequences such that each subset of the image sequences comprises the base image sequence and at least one other image sequence comprises:
    adjusting the one or more subsets of image sequences based on at least one of the following criteria:
    each subset of image sequences comprises a predetermined number of image sequences; and
    each of the image sequences belongs to one subset of the image sequences.

13. The storage medium of claim 10, wherein the operations further comprise:
    determining correlated images in each subset of image sequences based on the degrees of correlation; and
    calculating a feature match of each of the correlated images for three-dimensional image reconstruction.

* * * * *